United States Patent [19]
Smith et al.

[11] Patent Number: 5,194,786
[45] Date of Patent: Mar. 16, 1993

[54] LINEAR CURRENT SOURCE AMPLIFIER FOR BRUSHLESS DC MOTOR

[75] Inventors: David R. Smith, Salem; Robert Villamil, Roanoke, both of Va.

[73] Assignee: Kollmorgen Corporation, Simsbury, Conn.

[21] Appl. No.: 661,676

[22] Filed: Feb. 27, 1991

[51] Int. Cl.$^5$ .......................................... H02K 29/00
[52] U.S. Cl. ................................... 318/254; 318/138; 318/439; 318/798
[58] Field of Search ............... 318/254, 138, 439, 768, 318/798, 805, 806, 812

[56] References Cited

U.S. PATENT DOCUMENTS

| | | | |
|---|---|---|---|
| 4,061,952 | 12/1977 | Dinsdale et al. | 318/572 |
| 4,348,632 | 9/1982 | Galwey et al. | 318/632 X |
| 4,922,169 | 5/1990 | Freeman | 318/138 X |
| 4,977,356 | 12/1990 | Otani et al. | 318/138 |
| 4,978,895 | 12/1990 | Schwarz | 318/254 |
| 4,990,893 | 2/1991 | Moren et al. | 318/701 X |

Primary Examiner—William M. Shoop, Jr.
Assistant Examiner—David Martin
Attorney, Agent, or Firm—Morgan & Finnegan

[57] ABSTRACT

There is provided a linear current source amplifier for brushless DC motors with linear characteristic and low noise at high currents. A servo current loop for comparing a desired current with the actual winding current is provided to produce a global error signal. A plurality of linear current followers or power stages are configured such that each one of them is capable of providing a current to motor winding proportional to error signal. The power stages are arranged so that a local feedback signal proportional to the current supplied by the power stage is fed back and compared with a signal proportional to the global error signal to drive the current sources. The multiple power stage current sources in one embodiment are configured in a current loop fashion to energize the motor windings.

18 Claims, 3 Drawing Sheets

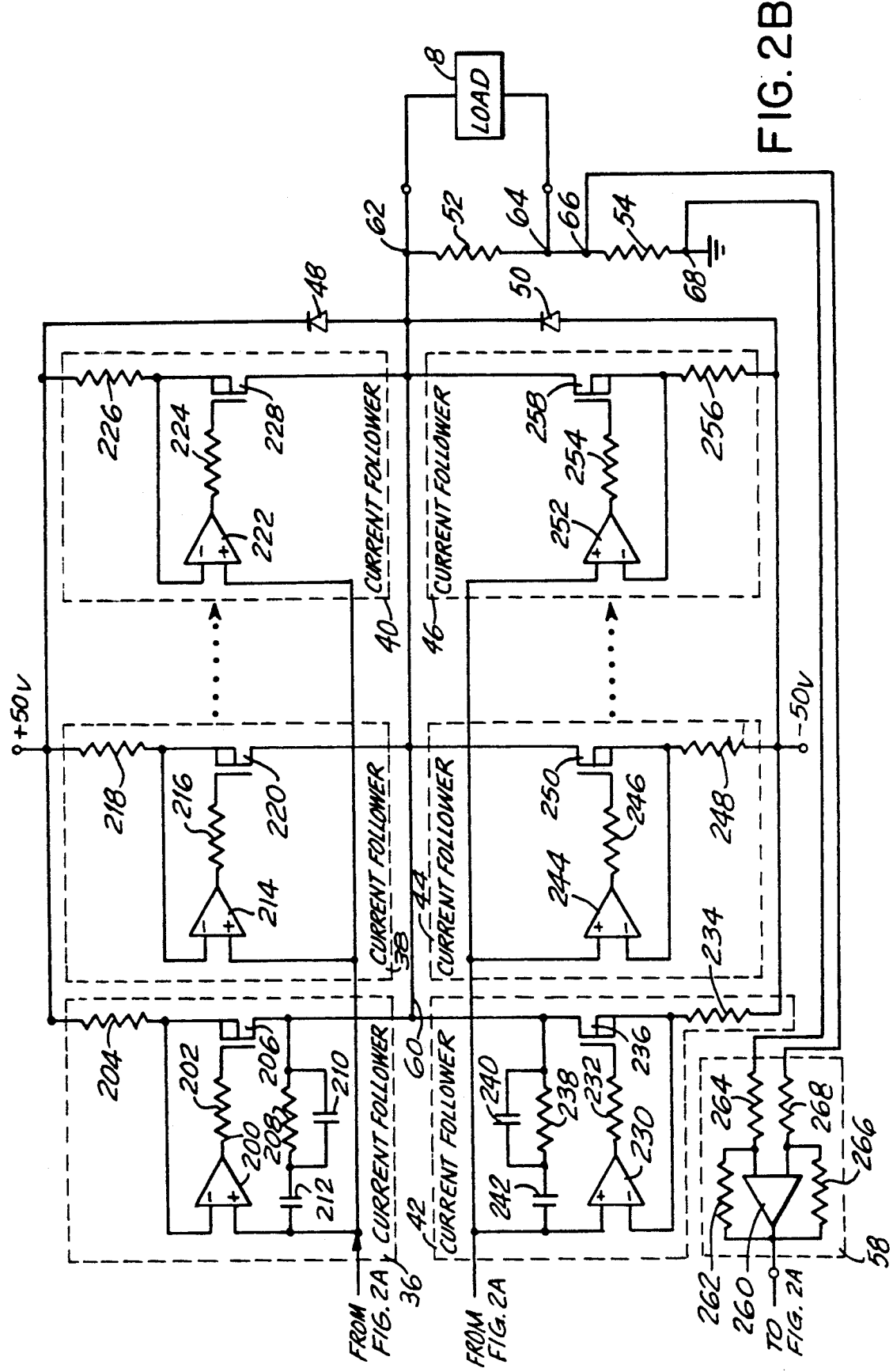

LINEAR CURRENT SOURCE AMPLIFIER FOR BRUSHLESS DC MOTOR

BACKGROUND OF THE INVENTION

Brushless DC motors have been used in many applications because of their inherent high inertia to weight ratios, their improved heatsinking capabilities, and the lack of brushes for commutation. In most applications, brushless motor drives, in addition to commutating the motor, are designed as transconductance amplifiers providing control of motor current in response to an input voltage command. Motor current determines motor torque. There are primarily two commutation schemes for brushless motors, commonly referred to as 6-step or squarewave commutation and sinusoidal or sinewave commutation.

In summary, squarewave commutation applies the amplifier voltage to the proper pair of motor terminals in discrete 60° (electrical) increments based upon the motor rotor position and the motor back EMF (BEMF) and based upon the desired direction of rotation. This has two effects: 1) The variation in motor torque during a commutation interval is dependent upon the variation in motor torque constant, Kt, during that interval, and 2) The use of discrete 60° switching points causes slight, but abrupt, changes in torque when the motor commutates from one interval to the next.

Sinusoidal commutation seeks to eliminate those changes in torque by applying the amplifier voltage in a continuous fashion to all three phases as a function of rotor position and motor BEMF. The disadvantages of sinusoidal commutation are increased rotor position sensor cost and increased electronic complexity of the amplifier.

Since the brushes are replaced with electronic switches and commutation circuitry, and since, in most cases, system efficiency is of prime importance, switching amplifiers have been preferred for driving brushless motors. A typical example is the use of Pulse Width Modulators (PWMs) at the current output stage of motor control systems and related switching topologies. The switching amplifiers, however, generate electromagnetic or radio frequency interference. There are situations where the electromagnetic interference, both conducted and radiated, generated by switching amplifiers is detrimental to system performance and alternative means of commutation and control must be used.

One method of reducing unwanted electromagnetic interference is the use of linear amplifiers to perform motor commutation and current control. There is no switching associated with the use of linear amplifiers, and therefore the electromagnetic frequency generated because of electric pulses can be completely eliminated.

Although linear amplifiers eliminate electromagnetic interference they also suffer from being less efficient than switching amplifiers; maximum power efficiency for a class AB amplifier is typically less than 75%. Efficiency becomes a critical design consideration in motor applications where high output power capability is required. Another design consideration is that as the power output requirements of amplifiers increase so does the need for multiple output power devices with thermal stabilizing circuits.

In order to increase current capability, many output power transistors may have to be connected in parallel. One of the problems facing a designer is the need for output power devices to equally share output current to prevent any one device from overheating. Overheating may cause thermal instability which ultimately leads to a phenomenon called thermal runaway where devices burn out due to temperature rise. Therefore for high current applications, designers have to implement thermal feedback amplifiers to improve thermal stability.

A further design consideration is to match the devices so that they can be connected in parallel. To gain component margin of safety, more devices are simply connected in parallel. Matching the output power devices, however, is another time consuming task. It requires an operator to manually or automatically test many transistors with a curve tracer and to locate transistors with exactly similar voltage-current curve characteristics. This procedure, however, does not guarantee predictable performance, because transistors' characteristics change differently over temperature and time.

Therefore, when space is at a premium and accurate individual device reliability is required, or when interaction between paralleled devices causes unpredictable performance, another method must be used. For a majority of applications switching amplifiers like Pulse Width Modulators were quite useful and sufficient. But for applications where electromagnetic interference is undesirable, a linear amplifier must be used which avoids the design problems discussed above.

SUMMARY OF THE INVENTION

With the foregoing in mind, it is an object of this invention to provide a new and improved linear current source amplifier for brushless DC motors with a linear characteristic and low noise at high currents.

It is a further object of this invention to provide a multiple current source scheme such that the output current capability may be easily increased or decreased.

It is still a further object of this invention to provide redundancy at the output stage so that loss of one stage in the amplifier does not result in total loss of amplifier function.

It is still a further object of this invention to provide a multi-current control loop for controlling motor torque.

One of the important aspects in the invention is the use of multiple power stage current sources which permit efficient current sharing independent of circuit characteristics in a transconductance amplifier. Although the invention described herein may be used with either sinewave or squarewave commutation schemes, the best mode description involves sinewave commutation.

The multiple power stage current sources each include a power MOSFET and an operational amplifier, which provide a current proportional to a global error signal. The power stages are arranged so that a local feed back signal proportional to the current supplied by the power stage is fed back and compared with a signal proportional to the global error signal to drive the power MOSFET via the operational amplifier. Therefore each local current source has its own local feedback signal. In the preferred embodiment, the multiple power stage current sources are configured in a servo current loop to energize the motor windings. The current loop error signal is applied to the multiple power stage current sources through a bipolar current source. This technique forces each individual MOSFET in the multiple power stages to provide a specific amount of current in response to the global error signal. Therefore the MOSFET current sources can be safely paralleled. The modular current source scheme provides additional benefits in that output current capability of a given amplifier may be easily increased or decreased by adding or subtracting source stages. The multiple current source arrangement also provides redundancy, such that the loss of one stage, while lowering total output capability, does not otherwise effect the operation of the amplifier.

BRIEF DESCRIPTION OF THE DRAWINGS

FIGS. 2A and 2B are circuit diagrams illustrating the operation of the linear amplifier.

DETAILED DESCRIPTION OF THE DRAWINGS

Figure 1:
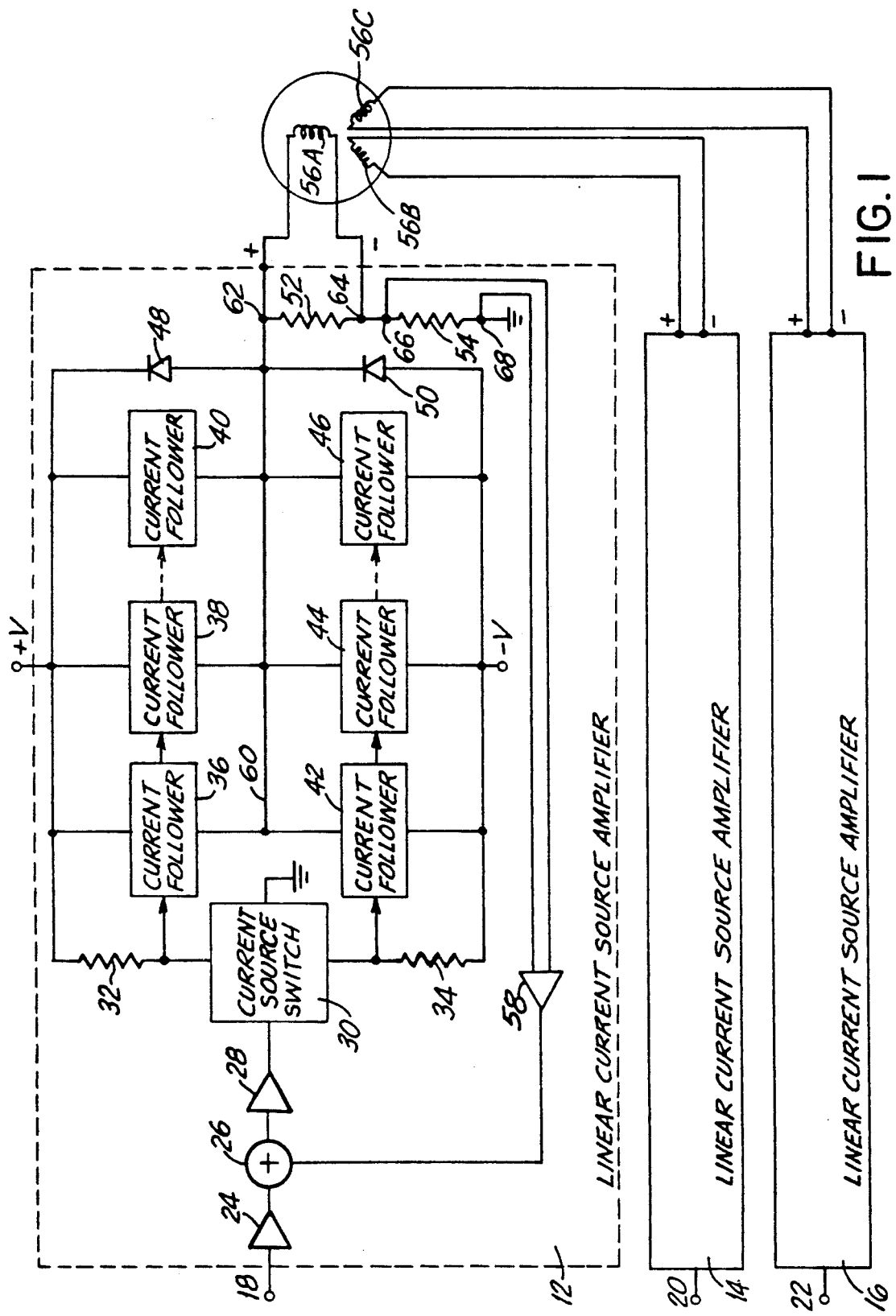
FIG. 1 is a block diagram illustrating one preferred embodiment according to the invention.

Referring now to the drawings in which like numerals represent like components, FIG. 1 illustrates a block diagram of the linear current amplifier.

A typical motor includes three stator windings 56A, 56B and 56C with an independent winding connection. Each winding of the motor has a separate drive amplifier for generating the desired current for the winding. Hence, for a three phase motor, three similar linear current amplifiers 12, 14 and 16 are required.

Amplifier 24 serves as an input stage of the linear amplifier. The current command signal representing the desired current at the output terminal 62, is supplied Resistor 54 between terminal 64 and ground provide a feedback signal proportional to current supplied to motor winding 56A. The feedback signal developed across resistor 54 is supplied to summing junction 26 via an amplifier 58.

Summing junction 26 is coupled to a bipolar current source 30 via an amplifier 28. The bipolar current source is connected in series with resistors 32 and 34 between the positive voltage source +V and the negative voltage source −V to create a current through one of the resistors proportional to the servo loop error depending on the polarity of the error signal. The voltage drop across resistor 32 is supplied to current followers 36, 38 and 40, so that each of the parallel current followers will provide a current to output current bus 60 in proportion to the applied voltage drop. The voltage drop across resistor 34 is supplied to current followers 42, 44 and 46 to likewise produce currents to output current bus 60. Current followers 36, 38 and 40 are connected between the positive source +V and output current bus 60 whereas current followers 42, 44 and 46 are connected between the negative source −V and output current bus 60.

The excitation current is controlled by the servo current loop. The signal proportional to output current at terminal 62 is compared with a current command signal at terminal 18, to provide a global error signal at the output of error amplifier 28. Depending on the polarity of the current command signal, bipolar current source 30 allows a current flow either through resistor 32 or resistor 34. The amplitude of current flowing through resistors 32 or 34 is proportional to the global error signal. Current followers 36, 38 and 40, each act as independent current sources generating a specific amount of current in proportion to the current flowing in the current sensing resistor 32. Current followers 42, 44 and 46 likewise each act as independent current sources generating a specific amount of current in proportion to the current flowing in the current sensing resistor 34. The current followers acting as current sources operate in their linear characteristic region producing an output current at terminal 62 which may be easily increased or decreased by adding or subtracting more current follower stages. Flyback diodes 48 and 50 provide protection against current spikes generated by the motors.

Resistor 52 is in parallel with winding 56A. The resistance of the motor load is much smaller than the resistance of resistor 52. The output current is sensed by resistor 54. A voltage proportional to the current flowing through resistor 54, representing the actual output current is fed into amplifier 58. The output of amplifier 58 represents the actual current output and is compared against the desired current to derive a current error signal. Windings 56B and 56C are similarly provided with excitation currents generated by amplifiers 14 and 16.

Figure 2A:
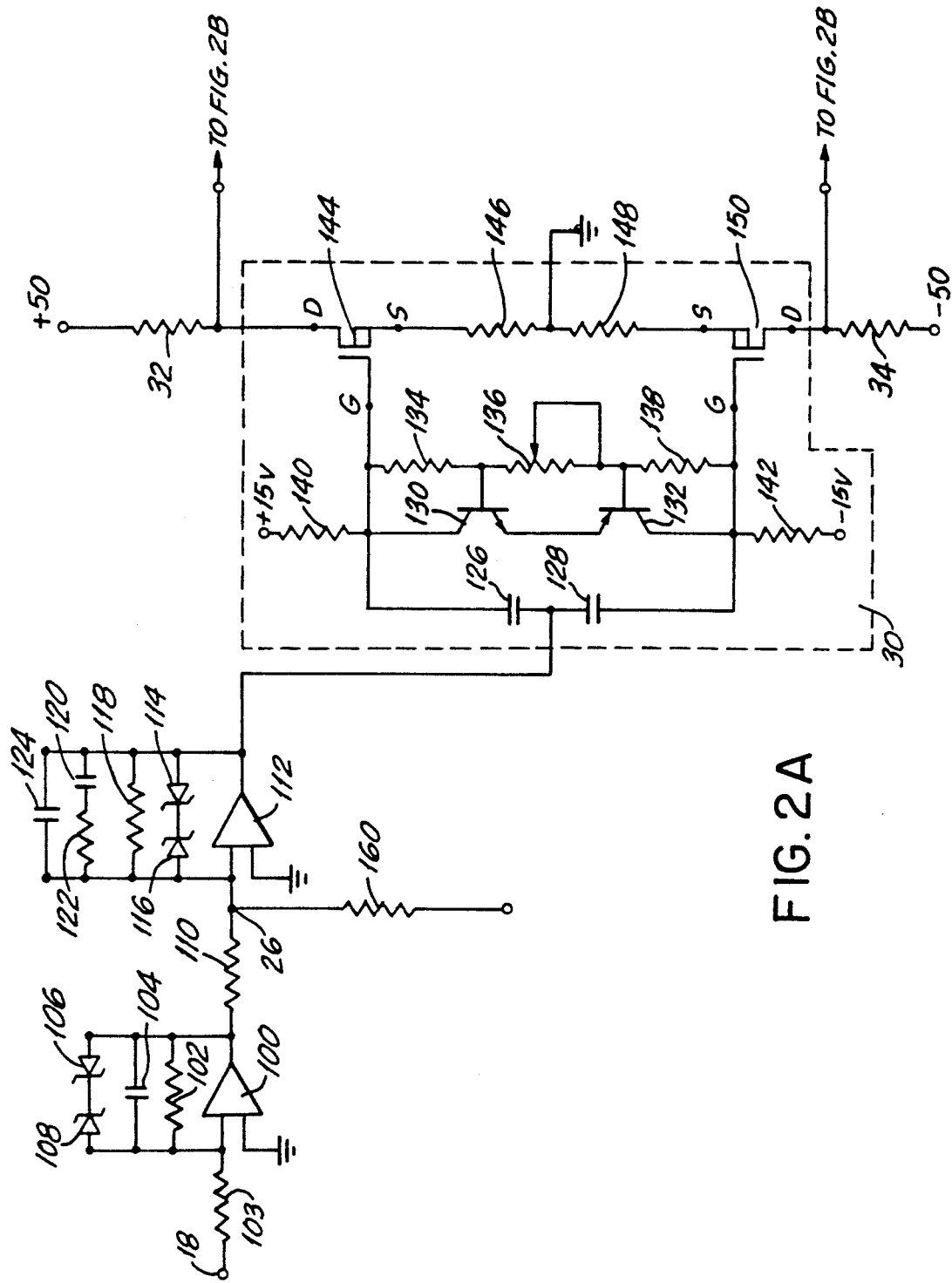

The circuit details of amplifier 12 are described in FIG. 2A and FIG. 2B. Amplifiers 14 and 16, not described in detail have similar configuration. In FIG. 2A terminal 18, provides the current command signal to amplifier 24 for the corresponding stator winding 56A. Amplifier 24 includes an operational amplifier 100 along with a feedback network consisting of resistor 102 in parallel with capacitor 104 and zener diodes 106 and 108 which form a noise filter at the input stage. Terminal 18 is connected to the negative terminal of operational amplifier 100 via resistor 103. The positive terminal of operational amplifier 100 is connected to ground. Feedback resistor 102 in parallel with capacitor 104 connect the output of operational amplifier 100 to the negative terminal input thereof. Zener diodes 106 and 108 are connected back to back in parallel to feedback resistor 104. Resistors 102 and 103 determine the gain of the input amplifier which in this case is unity. Amplifier 100 acts as an input buffer with a very high input impedance and as a low pass filter. Zener diodes 106 and 108 operate as voltage clamps.

Amplifier 28 connected to summing junction 26 for producing the current error signal includes an operational amplifier 112. The output of amplifier 100 represents the desired amplitude of current to be supplied to the stator winding 56A, and is connected to summing junction 26 through summing resistor 110. The output voltage of operational amplifier 100 is summed with the voltage feedback across resistor 160 representing the actual output current fed to winding 56A. A feedback network including zener diodes 114 and 116, resistor 118, capacitor 124 and RC network including resistors 122 and capacitor 120 connect the negative input of operational amplifier 112 to its output terminal. Resistor 118 defines DC the gain of operational amplifier 112. Capacitors 120 and 124 and resistor 122, form a compensation network for the current loop. Zener diodes 114 and 116 operate as voltage clamps.

The output of amplifier 260 in FIG. 2B represents the feedback signal indicating the actual current output in winding 56A. The output of amplifier 260 is 180° out of phase from the signal at the output of operational amplifier 100 in FIG. 2A. The output of amplifier 260 is connected to summing junction 26 in FIG. 2A through resistor 160.

Referring to FIG. 2A amplifier 112 and the related components form a summing circuit which sums signals representing the actual current from the feedback circuitry with signals representing the desired current from current command terminal to produce the difference at the output of amplifier 112 which is referred to as "global error signal". The current supplied to the stator winding is automatically controlled in servo loop fashion so that the actual output current is essentially the same as the desired current indicated by the current command signal.

The bipolar current source 30 in FIG. 1 is shown in detail in FIG. 2A and further explained hereinafter. NPN transistor 130 and resistors 134 and 136 form a 'VBE multiplier' which acts to shift positive voltage derived from the output of operational amplifier 112 to an appropriate level for driving transistor 144. Similarly PNP transistor 132 and resistors 138 and 136 form a second 'VBE multiplier' which acts to shift negative voltage derived from the output of operational amplifier 112 to an appropriate level for driving transistor 150. The voltage offset provided by the combination of transistor 130 and resistors 134 and 136 is a multiple of VBE.

The emitter of transistor 130 is connected to the emitter of transistor 132. The output of amplifier 112 is connected to the common junction of capacitors 126 and 128 connected, respectively, to the collectors of transistors 130 and 132. Resistor 140 is coupled between a +15 volt supply and the collector of transistor 130 and resistor 142 is coupled between a −15 volt supply and collector of transistor 132. A resistor 134, a variable resistor 136 and a resistor 138 are connected in series provide a voltage divider across transistors 130 and 132. The base junction of transistor 130 is connected to the junctions of resistors 134 and 136 and the base of transistor 132 is connected to the junction of resistors 136 and 138.

The level shifters as described above are able to bias MOSFET transistors 144 and 150. The gate of transistor 144 is connected to the collector of transistor 130, and the gate of transistor 150 is connected to the collector of transistor 132. The source of transistor 144 is connected to ground via resistor 146, and the source of transistor 150 is connected to ground via resistor 148. The drain of transistor 144 is connected to a +50 Volt supply via sensing resistor 32, and the drain of transistor 150 is connected to a −50 Volt supply via sensing resistor 34.

Depending on the amplitude of the global error signal derived from operational amplifier 112 transistors 144 or 150 will turn on and allow for different levels of current flow. Transistor 144 is n-channel MOSFET transistor IRFD110, and transistor 150 is p-channel MOSFET transistor IRFD9120. Resistors 146 and 148 provide feedback to maintain bias stability for transistors 144 and 150.

Details of the current followers 36, 38 and 40 are shown in FIG. 2B. As previously mentioned, any desired number of current followers can be added for higher current capacities.

Current follower 36 acts as a precision current source and generates a current proportional to the voltage drop across resistor 32 in FIG. 2A. The junction of resistor 32 and the drain of n-channel MOSFET transistor 144 in FIG. 2A is connected to the non-inverting terminal of operational amplifier 200 in FIG. 2B. The output of operational amplifier 200 is connected to the gate of p-channel MOSFET transistor 206 via resistor 202. The source of transistor 206 is connected to the inverting terminal of operational amplifier 200. The source of transistor 206 is also connected to a +50 Volt supply via feedback resistor 204. The drain of transistor 206 is connected to the output current bus 60. Thus, the power stages are arranged so that a local feedback signal proportional to the current supplied by the power stage is fed back and compared with the global error signal to drive the power MOSFET via the operational amplifier.

When n-channel MOSFET transistor 144 is turned on, current flows through sensing resistor 32. The current is proportional to the gate terminal voltage of n-channel MOSFET transistor 144 in FIG. 2A which in turn is a function of the signal derived at the output of error amplifier 112. The current flow produces a voltage drop across resistor 32 applied to the non-inverting terminal of operational amplifier 200, which then momentarily becomes lower than the inverting terminal of operational amplifier 200 and the output therefor tends to become negative. This causes the p channel MOSFET transistor 206 to turn on allowing a current flow through feedback resistor 204. The current through feedback resistor 204 is such that the voltage drop across the resistor 204 is equal to the voltage drop across resistor 32. When transistor 206 is on, current flows to output current bus 60.

As mentioned before, the combination of operational amplifier 200, transistor 206 and feedback resistor 204 can be repeated as many times as necessary. Since all components operate at a linear region the sum of currents generated in the current bus 60 will have a linear characteristics. As depicted in FIG. 2B, current followers 38 and 40 are configured similar to current follower 36. The current followers coupled to the positive voltage source act as positive current source stages. Amplifier 214, transistor 220 and resistors 216 and 218, operates a precision current source with local feedback, adding current to output current bus 60. Amplifier 222, transistor 228 and resistors 224 and 226, operate as another precision current source with local feedback, adding current to output current bus 60. The positive input terminals of all operational amplifiers of the upper section are connected to the drain of n channel MOSFET transistor 144. Therefore the positive input terminals of all operational amplifiers in the upper section see the same voltage drop across sensing resistor 32.

Resistor 208 and capacitors 210 and 212 operate as a compensation network. Resistor 208 is in parallel with capacitor 210 and in series with capacitor 212. The series-parallel network is connected between the drain of n-channel MOSFET transistor 144 and output current bus 60. The purpose of the compensation network is to prevent voltage oscillation caused in the system.

The lower portion of the linear amplifier operates exactly the same as the upper portion except that it accommodates negative voltages. Current followers 42, 44 and 46 are therefore configured to add negative current to output current bus 60. The current followers coupled to the negative voltage source act as negative current source stages with local feedback. Current follower 42 has operational amplifier 230, resistor 232, n-channel MOSFET transistor 236 and feedback resistor 234 configured in a similar design as current follower 36.

When transistor 150 in FIG. 2A is turned on, current flows through sensing resistor 34 which produces a voltage drop across the resistor. Since the voltage applied to the non-inverting terminal of operational amplifier 230 momentarily becomes higher than the inverting terminal of operational amplifier 230, the output of the operational amplifier tends to become positive. This causes n-channel MOSFET transistor 236 to turn on allowing a current flow through feedback resistor 234. The amplitude of the current through feedback resistor 234 is such that the voltage drop across the resistor 234 is equal to the voltage drop across resistor 34. When transistor 236 is on, current flows to output current bus 60.

The combination of operational amplifier 230, transistor 236 and feedback resistor 234 can be repeated as many times as necessary. Since all components operate at a linear region, the sum of currents generated in the current bus 60 also has a linear characteristics.

Resistor 238 and capacitors 240 and 242 operate as a compensation network similar to compensation network 208-212. This compensation network is connected between the drain of p-channel MOSFET transistor 150 and the output current bus 60.

Flyback diodes 48 and 50 provide protection against current spikes generated by the motors. The cathode of diode 48 is connected to the +50 Volt supply and the anode of diode 48 is connected to output current bus 60. The cathode of diode 50 is connected to output current bus 60, and the anode of diode 50 is connected to the −50 Vol supply. The current at terminal 62 is supplied to the stator winding represented as load 80 in FIG. 2B.

In FIG. 2B terminal 64 provides for a current return path. Therefore the current supplied to the windings depicted as load 80 in FIG. 2B returns to terminal 64 and thereafter to ground through resistor 54. A large resistor 52 is connected across the load driven by the amplifier. Resistor 54 has a small resistance compared to that of load 80 and produces a voltage drop directly proportional to the current flowing through the load. Thus, resistor 54 in FIG. 2B operates as current sensing resistor.

A voltage representing the value of the actual current output of the linear amplifier is fed to operational amplifier 260 via a resistor network including input resistors 264 and 268, and feedback resistors 262 and 266. The output of amplifier 260 in FIG. 2B provides the feedback to summing junction 26 in FIG. 2A via resistor 160 to complete the current control loop.

One advantage of the invention over the prior art is that thermal bias circuits are not necessary to prevent overheating. For example, if output stage MOSFETS heat up and tend to provide more current, their local operational amplifiers reduce gate drive voltage automatically due to local current feedback in each local current source. In addition transistor mismatches can easily be tolerated. Due to high gain of operational amplifiers in individual current follower stages, the local feedback signals will all be the same voltage within +/−1% or so. However, the individual MOSFET gate drive signals in each current follower stage can vary significantly for various reasons, like changing transistor characteristics over time. Therefore despite the differences in gate drive voltages in every stage, equal currents can be derived from each stage due to the local feedback topology.

Another example of malfunction occurs when a current follower stage becomes inoperative. This results in a momentary current loss at the output which in turn results in an increase of the global error signal at the output of amplifier 112. The increased error signal increases the current flowing through resistors 32 and 34 to in turn increase the current generated in the remaining operating current followers. The current contributed by a current follower depends on the global error signal and is therefore independent of the individual current follower circuit characteristics. The presence of operational amplifiers in the current follower stages limits the voltage output connected to the gates of MOSFET transistors in the current follower stages to a maximum safe level.

As seen in FIG. 1 windings 56B and 56C are similarly provided with excitation currents by linear amplifiers 14 and 16 similar to the one disclosed connected to winding 56A.

Although not explicitly shown, it is possible to reconfigure the outside current loop to be a voltage loop to provide safe load sharing in the power stage for a linear voltage amplifier. In addition, this power stage design can also be used in amplifiers for a brush-type DC motor, again, due to the need for low EMI. Brush type DC motor power amplifiers can be designed in two ways. First, a single power stage could drive a motor with motor return referenced to ground. Second, two power stages could be used in an H-bridge configuration. This can be accomplished by eliminating one or two sets of power stages resulting in respectively two or one output terminals which may be connected to a brush-type motor.

Although one illustrative embodiment has been described in detail, it should be apparent that there are other embodiments within the scope of this invention. It is to be understood that the words which have been used are words of description, rather than limitation, and that change may be made within the preview of the appended claims without departing from the scope and spirit of the invention.

We claim:

1. A linear current source amplifier for providing current to a motor winding in a brushless D.C. motor having a plurality of motor windings, said linear current source amplifier comprising:
 a servo current loop for comparing a desired current command with the actual winding current in said winding to produce a current loop error signal for said winding; and
 a plurality of linear current sources connected in parallel each current source operating in its linear region and having a local feedback for providing a current to said winding said current being substantially equal to currents provided by other current sources connected in parallel and being proportional to said current loop error signal.

2. A linear current source amplifier as claimed in claim 1 further comprising a bipolar current source means for providing a current in proportion to said current loop error signal, said bipolar current source means coupled to said plurality of linear current sources.

3. A linear current source amplifier as claimed in claim 2, wherein each one of said linear current sources further comprising:
 positive current source stages and negative current source stages; and
 said bipolar current source means generating a reference signal for said positive current source stages when said current loop error signal has a first polarity and said bipolar current source means generating a reference signal for said negative current source stages when said current loop error signal has a second polarity.

4. A linear current source amplifier according to claim 3 wherein said servo current loop comprises:

a common error amplifier further comprising an operational amplifier for deriving said current loop error signal;

a summing terminal connected to said operational amplifier;

an output current sense amplifier, having an input for receiving a signal proportional to actual output current and having an output coupled to said summing terminal; and a current command signal coupled to said summing terminal.

5. A linear current source amplifier according to claim 4, wherein said bipolar current source means comprises:

transistor means driven by said current loop error signal, said transistor means providing for a flow of current, said current proportional to said current loop error signal.

6. A linear current source amplifier according to claim 5, wherein said bipolar current source is coupled to a positive voltage supply by a first sensing resistor and coupled to a negative voltage supply by a second sensing resistor.

7. A linear current source amplifier according to claim 6 wherein said bipolar current source means generate a voltage across said first sensing resistor proportional to said current loop error signal, said voltage across said first sensing resistor being coupled to said positive current source stages, said bipolar current source means generate voltage across said second sensing resistor proportional to said current loop error signal, said voltage across said second sensing resistor being coupled to said negative current source stages.

8. A linear current source amplifier according to claim 6, wherein said bipolar current source further comprising:

a n-channel MOSFET having a source, a gate and a drain, said drain coupled to said positive voltage supply by said first sensing resistor, said source coupled to ground by a feedback resistor;

a p-channel MOSFET having a source, a gate and a drain, said drain of said p-channel MOSFET coupled to said negative voltage supply by said second sensing resistor, said source of said p-channel MOSFET coupled to ground by a feedback resistor, said source of said p-channel MOSFET also connected to said source of said n-channel MOSFET;

said gate of said n-channel MOSFET coupled to output of said common error amplifier and said gate of said p-channel MOSFET also coupled to output of said common error amplifier; and said drain of said n-channel MOSFET coupled to said positive current stages and said drain of said p-channel MOSFET coupled to said negative current stages.

9. A linear current source amplifier as claimed in claim 1 further comprising:

D.C. Voltage source;

a bipolar current source means connected to D.C. voltage source for generating a reference current in response to said current loop error signal; and said plurality of linear current sources coupled to said bipolar current source means, said linear current sources each capable of providing a current in response to said bipolar current source means.

10. A linear current source amplifier as claimed in claim 9 wherein said bipolar current source means is coupled to a positive D.C. voltage source by a first terminal and is coupled to a negative D.C. voltage source by a second terminal.

11. A linear current source amplifier as claimed in claim 10, wherein each one of said linear current sources further comprising:

positive current source stages and negative current source stages; and said bipolar current source means generating a reference signal for said positive current source stages when said current loop error signal has one polarity, said bipolar current source means generating a reference signal for said negative current source stages when said current loop error signal has a reverse polarity.

12. A linear current amplifier in accordance with claim 11 further comprising:

output current sensing means connected to provide an indication of the actual output current of said linear amplifier;

means for receiving a current command signal indicating the desired current; and said servo current loop comparing said indication of actual current to the indication of desired current to produce said current loop error signal for providing output current.

13. A linear current source amplifier according to claim 12, wherein said means for receiving a current command signal is an input stage comprising an input buffer stage and a noise filter.

14. A linear current source amplifier for providing current to a motor winding in a brushless D.C. motor having a plurality of motor windings comprising:

a servo current loop for comparing a desired current command with the actual output current to produce a current loop error signal;

a plurality of linear current sources connected in parallel each current source operating in its linear region and further comprising a local feedback loop for comparing a signal proportional to said current loop error signal with a signal proportional to a current supplied by each one of said linear current sources, said local feedback loop controlling the flow of said current supplied by each one of said linear current sources.

15. A linear current source amplifier as claimed in claim 14, further comprising:

bipolar current source means driven by said common error signal for generating a current in response to said current loop error signal, wherein said bipolar current source means is coupled to said plurality of linear current sources.

16. A linear current source amplifier according to claim 15, wherein said linear current sources further comprising positive current source stages and negative current source stages.

17. A linear current source amplifier according to claim 16, wherein each of said positive stages of said plurality of linear current sources further comprising:

a power MOSFET transistor having a source, a gate and a drain, such that the gate of said transistor is coupled to the output of an operational amplifier, the source of said transistor connected to a positive voltage supply by a current sensing resistor, said source of said transistor also connected to inverting terminal of said operational amplifier, said transistor providing a current in response to a voltage drop appearing at non-inverting input of said operational amplifier.

18. A linear current source amplifier according to claim 16, wherein each negative current stage of said plurality of linear current followers further comprising:
a power MOSFET transistor having a source, a gate and a drain, such that the gate of said transistor is coupled to the output of an operational amplifier, the source of said transistor coupled to a negative voltage supply by a current sensing resistor, said source of said transistor also connected to inverting terminal of said operational amplifier, said transistor providing a current in response to a voltage drop appearing at non-inverting input of said operational amplifier.

* * * * *